G. L. D. JAMES.
ECONOMIZER AND DECARBONIZER FOR INTERNAL COMBUSTION ENGINES.
APPLICATION FILED NOV. 19, 1919.

1,404,964. Patented Jan. 31, 1922.

Inventor
G.L.D.James,
By H.R.Kerslake
Attorney

UNITED STATES PATENT OFFICE.

GEORGE LLEWELLYN DENTON JAMES, OF AUCKLAND, NEW ZEALAND.

ECONOMIZER AND DECARBONIZER FOR INTERNAL-COMBUSTION ENGINES.

1,404,964. Specification of Letters Patent. Patented Jan. 31, 1922.

Application filed November 19, 1919. Serial No. 339,234.

*To all whom it may concern:*

Be it known that I GEORGE LLEWELLYN DENTON JAMES, a subject of His Majesty the King of Great Britain, residing at 17 Epsom Avenue, Epsom, Auckland, New Zealand, have invented a certain new and useful Improvement in an Economizer and Decarbonizer for Internal-Combustion Engines, of which the following is a specification.

This invention relates to internal combustion engines and provides for the utilization of the heat and gases contained in the exhaust of said engines for the purpose of separating the hydrogen and oxygen of water, conjointly with the admission of an injection of steam, air, exhaust gases, and the hydrogen so separated into the fuel intake of an engine, whereby the hydrocarbons of benzine and kerosene used for producing power are considerably enriched and greater power is obtained.

According to the invention water is vapourised by the heat of the exhaust pipe of an engine, the steam produced being directed into a steam jacket in the lower end of a casing, and surrounding a central passage from the engine exhaust pipe to a sleeve valve which serves as a gas generator in the upper portion of said casing.

The bottom of the sleeve valve has a central port therein and forms the top of the steam jacket, and closes on a seating around the outlet of said central passage, while a needle valve adjustably secured through the top of the sleeve valve closes said passage.

The sleeve valve is provided with a raised thread which screws into the casing and is also provided with an elongated port opening through its circumference, and adapted to be brought opposite a gas connection from the casing to the engine fuel intake.

A control lever adjustably secured to the top of said sleeve valve enables same to be partially turned and raised by the one operation, so as to open the steam jacket and the central passage, to the interior of the sleeve valve, simultaneously with the putting of the latter into communication with the gas connection to the engine intake, through the aforesaid elongated port.

Provision is made for regulating the passage of water to the vapouriser, and the desired amount of air can also be admitted to the steam jacket by providing an air inlet valve on the steam connection.

The invention will be more readily understood on reference to the accompanying drawing, which illustrates a suitable attachment for carrying the invention into effect:—

Figure 1:
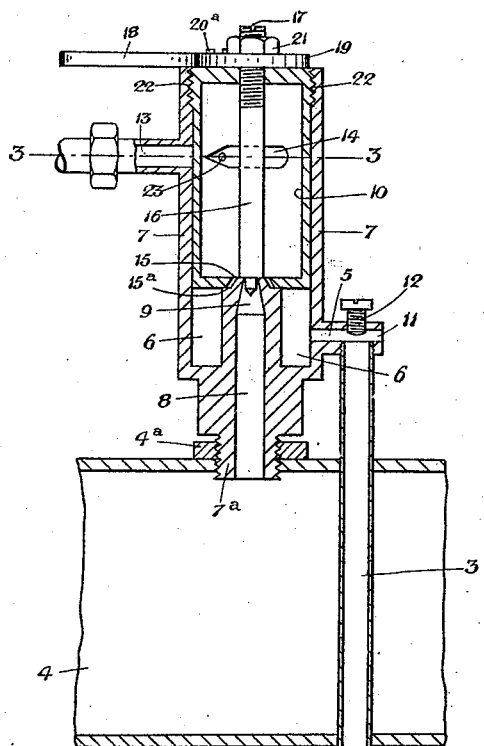

Figure 1 being a sectional elevation of the device employed, and

Figures 2, 3:
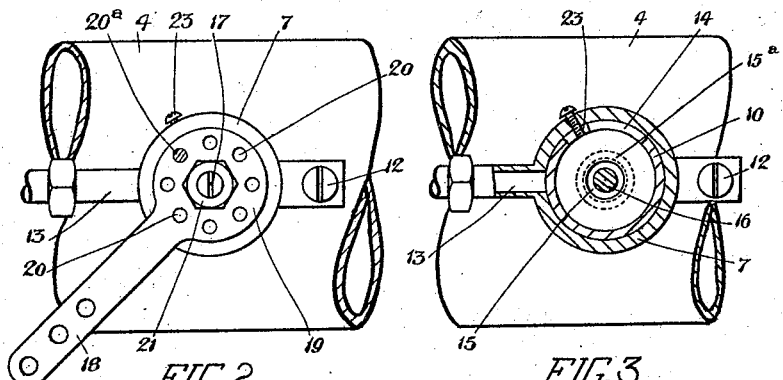

Figure 2 a plan view thereof, while

Figure 3 a sectional plan through the line 3—3 Figure 1.

A water supply pipe 1 provided with a control valve 2 communicates with a vapouriser 3 inserted in the engine exhaust pipe 4.

The vapouriser 3 communicates with a passage 5 leading to a steam jacket 6 in the lower portion of a casing 7, and surrounding a central passage 8.

The casing 7 is screwed into the exhaust pipe 4 by means of a nipple $7^a$, the passage 8 passing through the latter and leading from the pipe 4 to a sleeve valve 10 located in the upper portion of said casing 7.

The passage 8 terminates at its upper end in a jet 9, and a nut $4^a$ screwing on the nipple $7^a$, locks the casing 7 on the pipe 4.

The passage 5 has an air inlet at 11 and is provided with an air admission valve 12 by means of which the desired amount of air can be admitted to mix with the steam passing to the jacket 6.

From the upper portion of the casing 7, a connection 13 leads to the fuel intake of the engine and enters same after the ordinary carburetor or vapouriser connection, the interior of the valve 10 being opened to the connection 13 through a port 14 opening through the circumference of the valve, on the latter being given a partial turn.

The valve or gas generator 10 is closed at its upper end and has a central opening 15 in its lower end, the edge of said opening 15 closing on a recessed seating $15^a$ surrounding the jet 9 of the passage 8. When the valve or gas generator 10 is raised so that the edge of the opening 15 lifts off the recessed seating $15^a$, the steam jacket 6 is put into communication with the interior of the valve 10.

A needle valve 16 capable of adjustment through the upper end of the valve 10, by having an upper screwed end and a cross cut 17 therein, enters and closes the mouth of the jet 9, and when lifted with the valve 10 opens the passage 8 to the interior of said valve 10.

A control lever 18 terminating in a disc 19 with a series of holes 20 therein is placed over the upper end of the valve 16, one of the holes 20 in the disc being placed over a pin 20ª projecting from the valve 10.

After the lever 18 has been placed on the valve 10 at the desired angle, and the valve 16 adjusted in the valve 10, the latter and the valve 16 and lever 18 are locked together by the nut 21 screwing on the valve 16.

A raised or projecting thread 22 around the upper end of the sleeve valve 10, and working in a corresponding thread cut in the casing 7, enables the sleeve valve 10 and needle valve 16 to be raised together to open the steam jacket 6 and the passage 8 to the interior of the valve 10, simultaneously with the bringing of the port 14 opposite the connection 13, by the one and same partial turning movement of the control lever 18, whereby gas generated in the sleeve valve 10 is permitted to pass to the engine intake.

A stop 23 screwed through the casing 7 and entering the port 14 limits the turning movement of the sleeve valve 10 in either direction.

The port 14 is tapered at its end which is first brought opposite the connection 13, in order that the amount of gas passing from the interior of the valve 10 to the connection 13 may be regulated to a small degree.

The valves 2, 10 and 16 all being capable of independent adjustment the proportion of air, exhaust gas and steam delivered to the combustion chambers of the engine cylinders is adjustable in accordance with the value of the liquid fuel vapor, thereby enabling the obtaining of the most efficient mixture of gases.

The mixture produced not only enables more power to be produced when mixed with kerosene and benzine hydrocarbons, but the chemical effect is such that carbon is consumed.

The admission of air prolongs the period of explosion giving a less violent momentary impulse, thereby eliminating the objection to the use of hydrogen in internal combustion engines.

As the connection 13 from the device communicates with the intake of the engine after the carburetor or vaporizer, the gas produced by my invention mixes with the fuel vapor or gases and proportionately reduces the evaporation of liquid fuel in such type of engine.

What I do claim and desire to secure by Letters Patent of the United States is:—

1. An attachment to internal combustion engines, comprising, a casing in communication with the fuel intake of an engine and having a passage through its lower end communicating with the exhaust pipe of an engine; a steam jacket surrounding said passage and in communication with a vaporizer; a gas mixer in said casing above said jacket, adapted to receive steam and engine exhaust gases; and means for controlling the entrance of steam and engine exhaust gases to said mixer and the exit therefrom of gas mixed, for the purpose set forth, substantially as described.

2. An attachment to internal combustion engines, comprising, a casing in communication with the fuel intake of an engine, and having a passage through its lower end communicating with the exhaust pipe of an engine; a steam jacket surrounding said passage; a vaporizer connected to said steam jacket; an air inlet in the connection between said vaporizer and said jacket; a gas mixer in said casing above said jacket and adapted to receive steam, air and engine exhaust gases; and means for controlling the entrance of steam and engine exhaust gases to said mixer and the exit therefrom of gas and steam, for the purpose set forth, substantially as described.

3. An attachment to internal combustion engines, comprising, a casing having an outlet from its upper portion; and in communication by means of a central exhaust passage through its lower end with an engine exhaust pipe; a steam jacket surrounding said passage; a vaporizer in said exhaust pipe, and connected to said jacket; an air inlet in the connection between said vaporizer and said jacket; a hollow valve screwing in said casing and having an upper tapered port through its circumference and a central port through its lower end, which latter forms the top to said jacket; a stop entering said upper tapered port; a recessed seating around said exhaust passage to take the edge of said central port; a needle valve adjustably screwed through the top of said hollow valve; an adjustable control lever on said hollow valve; and a feed pipe fitted with a control cock, to said vaporizer, substantially as described and illustrated.

In testimony whereof I affix my signature in presence of two witnesses.

GEORGE LLEWELLYN DENTON JAMES.

Witnesses:
WILLIAM PINCHES,
DORIS ELLEN RAPSAN.